Patented July 13, 1943

2,323,951

UNITED STATES PATENT OFFICE 2,323,951

REFRACTORY COMPOSITION

Eugene Wainer, Niagara Falls, N. Y., assignor to The Titanium Alloy Manufacturing Company, New York, N. Y., a corporation of Maine No Drawing. Application September 27, 1941, Serial No. 412,689

13 Claims. (Cl. 106—57)

This invention relates to refractory materials and compositions and methods of making the same. More particularly, it relates to refractory compositions containing zircon as the principal ingredient. By the term "refractory composition" is meant a composition which upon firing at an elevated temperature forms a coherent refractory mass.

In recent years, zirconium silicate or zircon has come into extensive use as a material for forming refractory masses. It is inert to many chemical substances and corrosive influences, has an extremely high melting point, and exists in nature in a form which is amenable to treatment and subsequent formation into refractory masses. In such applications, the zircon may be used as "sand" of about the particle sizes and appearance of ordinary silica beach sand, or as more finely divided material known as milled zircon, or as particles of larger size, known as zircon grog. In any case, in order to form firm coherent masses, such as bricks or other shapes, it is necessary that the particles be bonded together by means of an added bonding agent. Among the most widely used of such bonding agents has been phosphoric acid, either alone or in combination with other ingredients such as double zirconium silicates (as described and claimed in Kinzie and Wainer Reissue Patent No. 21,224), sodium fluosilicate (as described and claimed in Wainer and Hake Patent No. 2,267,772, on application Serial No. 285,580, filed July 20, 1939), alkali and alkaline earth and other zirconates (as described and claimed in Kinzie and Wainer Patents Nos. 2,220,411 and 2,220,412), and others.

A refractory structure, such as a crucible or other article, may be composed of a single fired shape, or composed of a plurality of rectangular brick or other shaped units joined to each other by means of a refractory cement. The latter is preferred particularly with structures of large size, so that a user can ram or form a suitable refractory structure in place without undue difficulty or expense. For best results, the cement used should have the same physical and chemical properties as the parent brick, to obtain a monolithic type structure for best service over an extended period. The most suitable type of cement or ramming mixture is one that reaches the customer in the ready mixed state, the sole addition necessary being tempering water. Naturally, such a cement mixture should have an indefinite shelf life before water is added. The prior refractory compositions disclosed above, in which phosphoric acid is used as a bonding agent, either alone or in combination with other materials, require that the phosphoric acid be kept separate from the other ingredients until just prior to use, to prevent initiation of the setting up reactions before use, which takes place when all the ingredients are mixed together. This is particularly undesirable when the cement or ramming mixture is used by anyone other than the original compounder. It necessitates shipping in two portions for use by the consumer, one portion containing liquid phosphoric acid and the other portion containing the zircon refractory base and solid bonding agent. This procedure is unsatisfactory for other reasons, since the portion containing phosphoric acid presents a difficult handling problem in view of the corrosive action of the acid on the usual container structures, particularly over extended periods. The procedure is further unsuitable because of the inconvenience to the consumer in view of the complication of an added mixing step and careful control of mixing technique which may lead to failure if not suitably carried out.

It is therefore an object of this invention to provide novel refractory compositions and techniques which eliminate all the defects and difficulties described above, and which still retain the advantages inherent in the use of phosphoric acid as a bond or supplementary bond for zircon refractory masses. It is another object to provide a refractory composition which is a complete mixture of all the necessary ingredients, except water, in the dry state, in which form it is shelf stable for an indefinite period. It is a further object to provide such a composition which may be packed in any of the usual types of containers for such materials without corrosion of any nature due to the product it contains. It is a still further object to provide such a composition which may be put to use by the consumer simply by mixing in water and shaping by customary means. A still further object is to provide such a composition which will set up and harden on addition of water, and after firing will have the same finished composition as the finished refractory which involved the use of liquid phosphoric acid in its make-up. Other objects will appear hereinafter.

These objects are accomplished by substituting for aqueous phosphoric acid a dry crystalline acid phosphate which on calcination in the presence of zirconium silcate yields reactable $P_2O_5$ able to combine with such zirconium silicate at elevated temperatures, the remaining portions of the crystalline acid phosphate having distilled off at relatively low temperatures.

It has been found, in accordance with this invention, that non-hygroscopic acid phosphates are admirably suited as bonding agents for zircon refractory compositions. They may be incorporated dry in such compositions, and are shelf-stable for indefinite periods. Of such acid phosphates, those of the alkali metals, calcium, magnesium and zinc may be used, but in general are not preferred for several reasons. Thus the acid phosphates of calcium, magnesium and zinc do not easily decompose to yield reactable $P_2O_5$ upon heating. The alkali metal acid phosphates are less objectionable from this standpoint, but they tend to leave a residue of low melting substances in the refractory mass, which detracts from its value as a high temperature refractory. The same general defects exist with other metal acid phosphates, although some such materials may not possess all these defects.

The preferred properties of the phosphates which may be utilized in the practice of the present invention are that they be non-deliquescent and non-hygroscopic, that is, that they maintain a dry condition on continued exposure to the air in finely powdered state. Furthermore, they should be chemically stable on exposure to the air for an indefinite period. In addition, the solubility in water should preferably be below 15 grams per 100 cc. of water at drying temperatures, such as 50° C. and above. The reason for this is that highly soluble salts tend to travel to the surface of the refractory during the drying stage. Upon further drying, these phosphates tend to crystallize out, thus not only weakening and developing scales on the surface but tending to remove an essential bonding agent from its sphere of useful action, thus lowering the amount of effective bond. Most importantly, the acid phosphates should decompose upon heating to form reactable $P_2O_5$, the remaining decomposition products being volatile and passing off. Finally, upon firing, they should preferably leave no residue of low melting point substances which detract from the refractory qualities of the product.

Acid phosphates which fulfill some or all of these characteristics are in general acid phosphates of ammonium and inorganic and organic derivatives of ammonium, particularly amines such as aniline. All these compounds, upon firing, easily decompose to form $P_2O_5$ and a volatile or decomposable residue which passes off as a gas. Ammonium mono- and dihydrogen phosphates are above the preferred range of solubility. Nevertheless, for many purposes, particularly where expense is important, either ammonium monohydrogen phosphate or ammonium dihydrogen phosphate may be the preferred material.

Among the derivatives of ammonium which are suitable for use in the practice of the present invention, may be mentioned hydrazine acid phosphate, hydroxylamine acid phosphate, and organic amine phosphates such as methylamine acid phosphate, ethylamine acid phosphate and aniline acid phosphate. These materials are generally of lower water solubility than the ammonium compounds. Generally, the monobasic diacid compounds are preferred, because they are cheaper and require less amine per unit weight of phosphate. Of these, monoaniline diacid orthophosphate, a white crystalline compound with a greenish blue tinge, is preferred. This compound may be prepared in the following manner: 1880 cc. of aniline oil is placed in a large shallow dish. To the aniline oil is added a solution of 1580 cc. of 75% $H_3PO_4$ (specific gravity 1.65) and 500 cc. of water in 2 to 3 minutes. The reaction is exothermic, taking place with vigorous boiling and yielding a hot, thick pasty mass. This mass is stirred until cool, a crumbly finely crystalline powder resulting. The crystals are spread in shallow trays and exposed to the atmosphere for 24 hours, after which they are pulverized to powder and are ready for use, being completely dry and free of caking tendency.

Other than aniline diacid orthophosphate, other amine acid phosphates may also be used. Examples are methylamine diacid orthophosphate, ethylamine diacid orthophosphate and others.

The aniline acid phosphate or other acid phosphate according to this invention is then substituted for aqueous phosphoric acid in zircon refractory compositions to yield a shelf stable refractory powder. While a wide variety of percentage additions can be used, the preferred limits are 2 to 7% based on the zircon content.

The invention having been described generally, the following preferred examples of modes of practicing the invention are given:

Example 1

A composition for ramming bricks, shapes, saggers, etc., is formed by mixing the following ingredients to form a shelf-stable refractory composition:

| | Pounds |
|---|---|
| —35 +150 zircon sand | 65 |
| —200 mesh zircon | 35 |
| Sodium fluosilicate | 3 |
| Aniline acid phosphate | 2 |

When ready for use, 9 to 11 pounds of water are added, and the composition is then mixed thoroughly, shaped, dried and fired as is customary in making refractory masses.

Example 2

A shelf-stable refractory composition is formed by mixing the following ingredients:

| | Pounds |
|---|---|
| —35 +150 mesh zircon sand | 65 |
| —200 mesh zircon | 35 |
| Aniline acid phosphate | 4 |

When ready for use, 9 to 11 pounds of water are added, and treated as in Example 1.

Example 3

A shelf-stable refractory composition, suitable for preparation of dense heat shock ware, is formed by mixing the following ingredients:

| | Pounds |
|---|---|
| —½ +⅛ inch zircon grog | 35 |
| —35 +150 zircon sand | 35 |
| —200 mesh milled zircon | 35 |
| Sodium fluosilicate | 3 |
| Aniline acid phosphate | 2 |

When ready for use, 8 to 10 pounds of water are added, and treated as in Example 1.

Example 4

A shelf-stable refractory composition, suitable as a cement for fired bricks, is formed by mixing the following ingredients:

| | Pounds |
|---|---|
| —35 +150 mesh zircon | 50 |
| —200 mesh zircon | 50 |
| Sodium fluosilicate | 3 |
| Aniline acid phosphate | 2 |

When ready for use, 11 to 14 pounds of water are added, and treated as in Example 1.

Example 5

A shelf-stable refractory composition, suitable as a lay up cement, is formed by mixing the following ingredients:

| | Pounds |
|---|---|
| —35 +150 mesh zircon | 50 |
| —200 mesh zircon | 50 |
| Aniline acid phosphate | 5 |

When ready for use, 11 to 14 pounds of water are added, and treated as in Example 1.

Example 6

A shelf-stable refractory cement, suitable as a ramming cement with quick setting properties, is formed by mixing the following ingredients:

| | Pounds |
|---|---|
| —35 +150 mesh zircon | 65 |
| —200 mesh zircon | 35 |
| Calcium zirconium silicate or sodium zirconium silicate, or magnesium zirconate or other double zirconium silicate or zirconate, or combinations of double zirconium silicates and zirconates | 4 |
| Aniline acid phosphate | 3 |

When ready for use, 10 to 12 pounds of water are added, and treated as in Example 1.

Example 7

A shelf-stable refractory cement, suitable as a ramming cement with quick setting properties, is formed by mixing the following ingredients:

| | Pounds |
|---|---|
| —½ +⅛ inch zircon grog | 35 |
| —35 +150 zircon sand | 35 |
| —200 mesh milled zircon | 35 |
| Calcium zirconium silicate or sodium zirconium silicate, or magnesium zirconate or other double zirconium silicate or zirconate, or combinations of double zirconium silicates and zirconates | 4 |
| Aniline acid phosphate | 3 |

When ready for use, 10 to 12 pounds of water are added, and treated as in Example 1.

Compositions according to the present invention can be stored for long periods of time without deterioration. When ready for use, it is merely necessary to add a suitable amount of water, mix thoroughly, and then proceed according to customary methods of forming and setting up refractory masses and cements.

As many variations are possible within the scope of this invention, it is not intended to be limited except as defined by the appended claims.

I claim:

1. A dry refractory composition containing a major portion of zircon and a minor portion of an acid phosphate taken from the group consisting of ammonium and inorganic and organic derivatives of ammonium.

2. A dry refractory composition containing a major portion of zircon and a minor portion of an ammonium acid phosphate.

3. A dry refractory composition containing a major portion of zircon and a minor portion of ammonium diacid orthophosphate.

4. A dry refractory composition containing a major portion of zircon and 2 to 7%, based on the zircon content, of an ammonium acid phosphate.

5. A dry refractory composition containing a major portion of zircon and 2 to 7%, based on the zircon content, of ammonium diacid orthophosphate.

6. A dry refractory composition containing a major portion of zircon and a minor portion of an acid phosphate of an ammonium derivative, said phosphate having a water solubility of less than 15 grams per 100 cc. of water at 50° C.

7. A dry refractory composition containing a major portion of zircon and a minor portion of a diacid phosphate of an ammonium derivative, said phosphate having a water solubility of less than 15 grams per 100 cc. of water at 50° C.

8. A dry refractory composition containing a major portion of zircon and a minor portion of an aniline acid phosphate.

9. A dry refractory composition containing a major portion of zircon and a minor portion of monoaniline diacid orthophosphate.

10. A dry refractory composition containing a major portion of zircon and 2 to 7%, based on the zircon content, of an acid phosphate of an ammonium derivative, said phosphate having a water solubility of less than 15 grams per 100 cc. of water at 50° C.

11. A dry refractory composition containing a major portion of zircon and 2 to 7%, based on the zircon content, of a diacid phosphate of an ammonium derivative, said phosphate having a water solubility of less than 15 grams per 100 cc. of water at 50° C.

12. A dry refractory composition containing a major portion of zircon and 2 to 7%, based on the zircon content, of an aniline acid phosphate.

13. A dry refractor composition containing a major portion of zircon and 2 to 7%, based on the zircon content, of monoaniline diacid orthophosphate.

EUGENE WAINER.